US009318832B2

(12) United States Patent
Shimada (10) Patent No.: US 9,318,832 B2
(45) Date of Patent: Apr. 19, 2016

(54) CONNECTOR (71) Applicant: JAPAN AVIATION ELECTRONICS INDUSTRY, LIMITED, Shibuya-ku, Tokyo (JP)

(72) Inventor: Masaaki Shimada, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 14/467,360

(22) Filed: Aug. 25, 2014

(65) Prior Publication Data

US 2015/0093940 A1 Apr. 2, 2015

(30) Foreign Application Priority Data

Oct. 1, 2013 (JP) .................................. 2013-206663

(51) Int. Cl.
*H01R 13/24* (2006.01)
*H01R 12/71* (2011.01)
*G06K 7/00* (2006.01)
*G06K 19/077* (2006.01)

(52) U.S. Cl.
CPC .......... *H01R 13/2442* (2013.01); *G06K 7/0021* (2013.01); *G06K 19/07741* (2013.01); *H01R 12/714* (2013.01)

(58) Field of Classification Search
CPC . G06K 7/00; G06K 7/0021; G06K 19/07741; H01R 12/714; H01R 13/2442
USPC ......... 439/629–631, 636, 676, 862, 489, 157, 439/159–160, 260, 326, 946
See application file for complete search history.

(56) References Cited

U.S. PATENT DOCUMENTS

| 8,109,794 | B2 | 2/2012 | Tanaka et al. | |
| 8,235,753 | B2 | 8/2012 | Tanaka et al. | |
| 2006/0040560 | A1* | 2/2006 | Uchida | ................ H01R 12/714 439/630 |
| 2010/0144179 | A1* | 6/2010 | Guo | ..................... G06K 7/0073 439/159 |

(Continued)

FOREIGN PATENT DOCUMENTS

| JP | 4385047 B2 | 12/2009 |
| JP | 2009295496 A | 12/2009 |
| JP | 2010135137 A | 6/2010 |

(Continued)

OTHER PUBLICATIONS

Japanese Office Action dated Sep. 25, 2014, issued in counterpart foreign Japanese Application No. 2013-206663.

*Primary Examiner* — Edwin A. Leon
(74) *Attorney, Agent, or Firm* — Holtz, Holtz & Volek PC (57) ABSTRACT A connector is connectable with a card which is inserted from an insertion opening. The card has a terminal. The connector comprises a holding member and a contact. The holding member has a rear support portion and a front support portion. The contact is held by the holding member. The contact has a base portion and a spring portion. The base portion has a rear supported portion, a front supported portion and a movable starting point. The rear supported portion is supported by the rear support portion. The front supported portion is supported by the front support portion. The movable starting point is positioned between the rear supported portion and the front supported portion. The spring portion extends frontward from the movable starting point in a front-rear direction. The spring portion is provided with a contact point which is to be in contact with the terminal of the card.

9 Claims, 11 Drawing Sheets (56) References Cited

U.S. PATENT DOCUMENTS

2010/0178807 A1 7/2010 Hashimoto et al.
2012/0108091 A1* 5/2012 Takai .................. G06K 7/0043
439/153

FOREIGN PATENT DOCUMENTS

| JP | 2010161012 A | 7/2010 |
| JP | 2014075332 A | 4/2014 |

* cited by examiner

CONNECTOR

CROSS REFERENCE TO RELATED APPLICATIONS

The applicant claims priority under 35 U.S.C. §119 of Japanese Patent Application No. JP2013-206663 filed Oct. 1, 2013.

BACKGROUND OF THE INVENTION

This invention relates to a connector to be connected to a card such as a Subscriber Identity Module (SIM) card.

For example, a card connector of this type is disclosed in JP-B 4385047 (Patent Document 1), contents of which are incorporated herein by reference.

Figure 20:
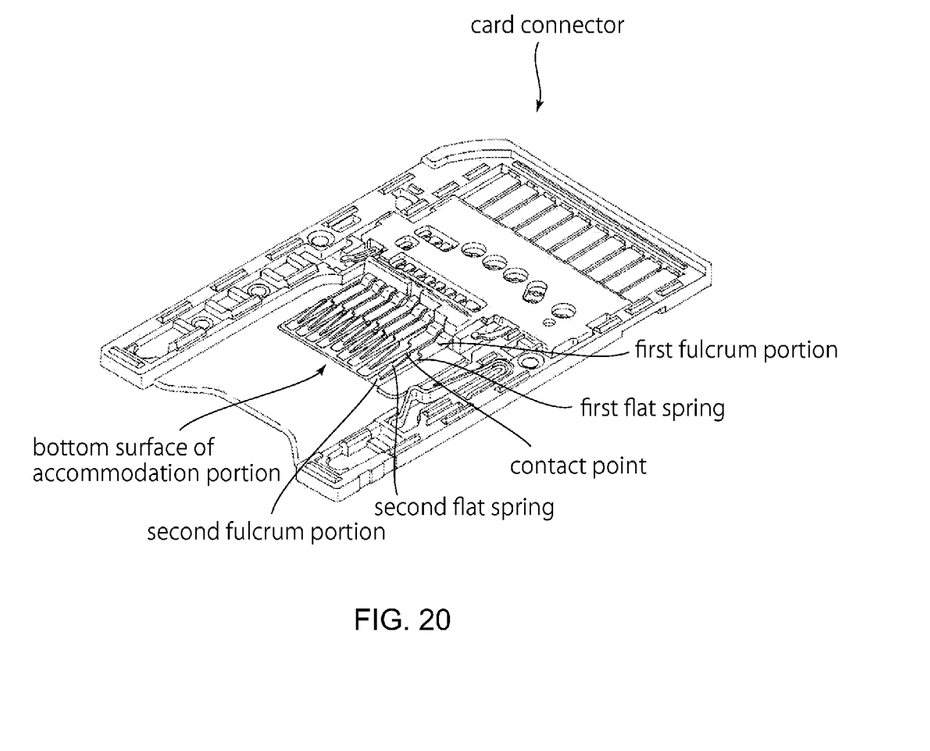
FIG. 20 is a perspective view showing a card connector of Patent Document 1.

As shown in FIG. 20, the card connector of Patent Document 1 includes contacts, each of which has a first fulcrum portion, a first flat spring, a second fulcrum portion and a second flat spring. The first fulcrum portion is constantly in contact with a bottom surface of an accommodation portion which accommodates a card. The first flat spring extends from the first fulcrum portion in a card ejecting direction. The second fulcrum portion is positioned at an end of the first flat spring. The second fulcrum portion is in contact with the bottom surface of the accommodation portion when the first flat spring is bent with the first fulcrum portion as a fulcrum. The second flat spring extends from the second fulcrum portion in a card inserting direction, which is a direction opposite to the card ejecting direction. An end of the second flat spring functions as a contact point which is in contact with a terminal of the card. With such a configuration, the card connector of Patent Document 1 secures a stable contact pressure.

Miniaturization of a connector to be connected to a micro SIM card or a nano SIM card is naturally required corresponding to a size of the cards. In addition, a contact point of a contact must be close to a card insertion opening. However, it is difficult that a structure of the connector of Patent Document 1 realizes both miniaturization of the connector and an arrangement where the contact point of the contact is close to the card insertion opening. In addition, sufficient contact pressure cannot be obtained by the arrangement.

SUMMARY OF THE INVENTION

It is therefore an object of the present invention to provide a connector which can be miniaturized and can secure sufficient contact pressure even if a contact point of a contact is close to a card insertion opening.

One aspect of the present invention provides a connector connectable with a card which is inserted from an insertion opening. The card has a terminal. The connector comprises a holding member and a contact. The holding member has a rear support portion and a front support portion. The front support portion is closer to the insertion opening than the rear support portion in a front-rear direction. The contact is held by the holding member. The contact has a base portion and a spring portion. The base portion has a rear supported portion, a front supported portion and a movable starting point. The rear supported portion is supported by the rear support portion. The rear supported portion is supported by the rear support portion. The front supported portion is supported by the front support portion. The movable starting point is positioned between the rear supported portion and the front supported portion in the front-rear direction while the movable starting point is movable in an up-down direction perpendicular to the front-rear direction. The spring portion extends frontward from the movable starting point in the front-rear direction. The spring portion is provided with a contact point which is to be in contact with the terminal of the card.

The spring portion extends from the movable starting point which is movable in the up-down direction while the contact point is provided on the spring portion. Thus, a moving distance of the movable starting point in the up-down direction contributes a moving distance of the contact point in the up-down direction. Accordingly, even if the spring portion is a short spring having a large spring constant, the contact point can be in contact with the terminal of the card at the same contact pressure as pressure in a case where the contact point is supported by a spring having a sufficiently small spring constant.

In addition, since the moving distance of the movable starting point in the up-down direction contributes the moving distance of the contact point in the up-down direction, a height of the whole contact can be lowered upon deformation of the contact. Specifically, a height from an upper surface of a substrate where the connector is mounted to the contact point of the deformed contact can be reduced.

Thus, a processing such as making a hole on the substrate is not necessary.

An appreciation of the objectives of the present invention and a more complete understanding of its structure may be had by studying the following description of the preferred embodiment and by referring to the accompanying drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Referring to FIGS. 1 to 4, a connector 10 according to the embodiment of the present invention has an insertion opening 20 at its front end side (negative Y-side). An accommodation portion 30 which accommodates a part of a card 800 (see FIG. 5) is provided at a rear side (positive Y-side) of the insertion opening 20 in a front-rear direction (Y-direction). The card 800 according to the present embodiment is a nano SIM card (fourth form factor (4FF) card).

As understood from FIGS. 1 to 4, the connector 10 comprises a holding member 100 made of an insulating material, a plurality of contacts 200 and a plurality of contacts 300 both made of conductors and a shell 400 made of a metal. The contacts 200, 300 are held by the holding member 100.

A plurality of reinforcing members 170 each made of a metal are inserted into the holding member 100. The shell 400 is fitted to the reinforcing members 170 which are positioned at opposite ends of the holding member 100 in a width direction (X-direction: right-left direction) so that the holding member 100 and the shell 400 form the insertion opening 20 and the accommodation portion 30.

Figure 4:
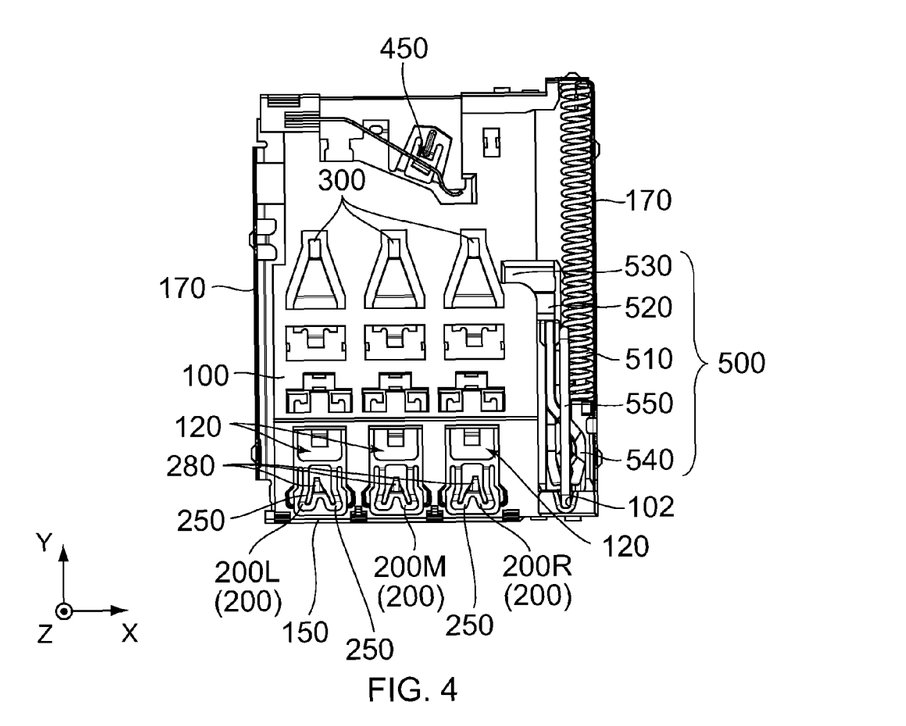
FIG. 4 is a top view showing a configuration other than the shell of the connector of FIG. 3.
Figure 9:
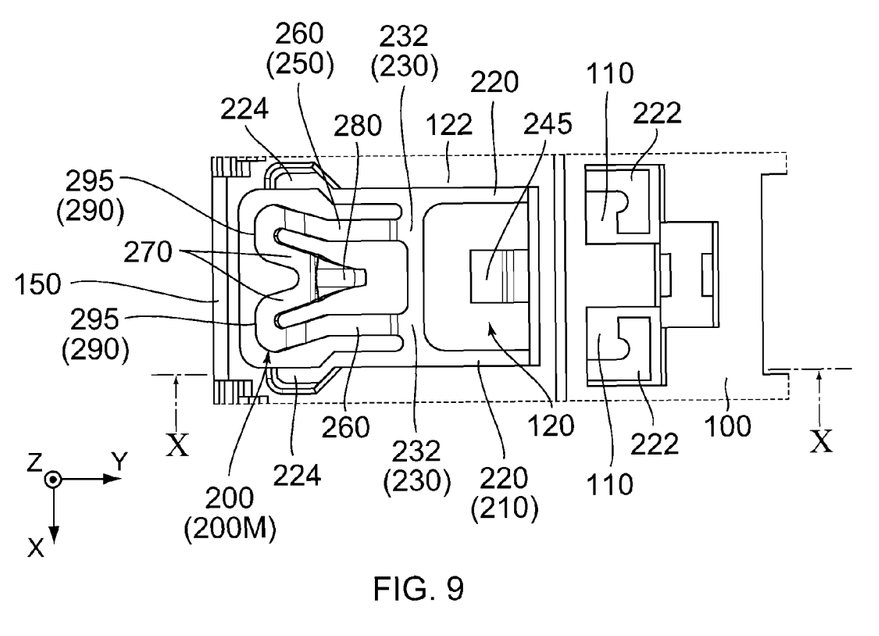
FIG. 9 is an enlarged, top view showing a part of the configuration of FIG. 4.
Figure 10:
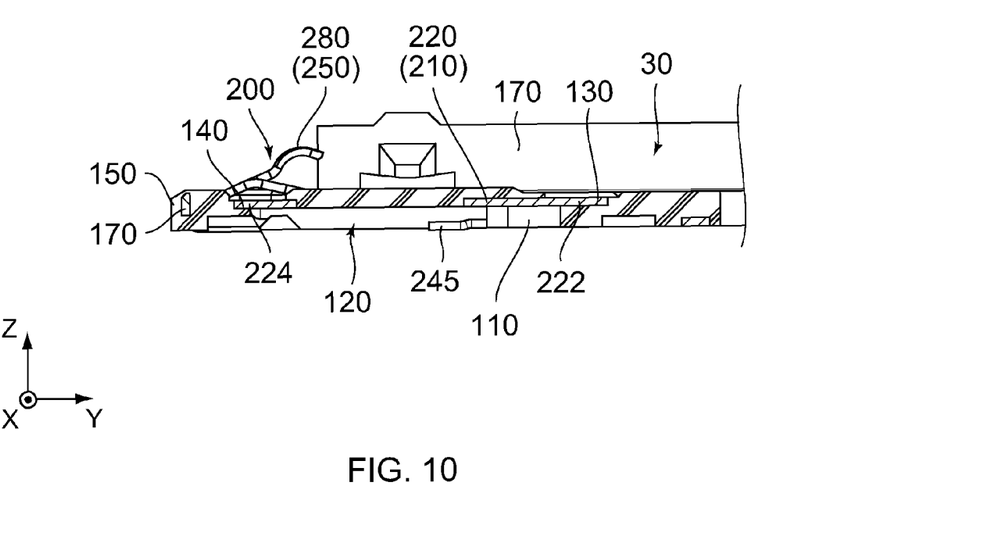
FIG. 10 is a cross-sectional view showing the configuration of FIG. 9, taken along line X-X.

In addition, as understood from FIGS. 4, 9, and 10, the holding member 100 is provided with holding portions 110, receiving portions 120, pressing portions 122, rear support portions 130 and front support portions 140. Each of the holding portions 110 holds the contact 200. The receiving portion 120 is positioned frontward, or toward the negative Y-side, of the holding portion 110. As understood from FIGS. 7, 9 and 10, the contact 200 held by the holding portion 110 extends frontward (in a negative Y-direction). The receiving portion 120 according to the present embodiment is an opening passing through the holding member 100 in an up-down direction (Z-direction). As described later, the receiving portion 120 is a space for permitting a deformation of the contact 200. Accordingly, the receiving portion 120 may be provided with a bottom part if the contact 200 can be deformed. The pressing portion 122 projects inward of the receiving portion 120 in the width direction (X-direction). The rear support portion 130 is positioned rearward, or toward the positive Y-side, of the receiving portion 120. The front support portion 140 is positioned frontward, or toward the negative Y-side, of the receiving portion 120. Specifically, the front support portion 140 is positioned frontward of the rear support portion 130. In other words, the front support portion 140 is closer to the insertion opening 20 than the rear support portion 130 in the front-rear direction (Y-direction).

Figure 1:
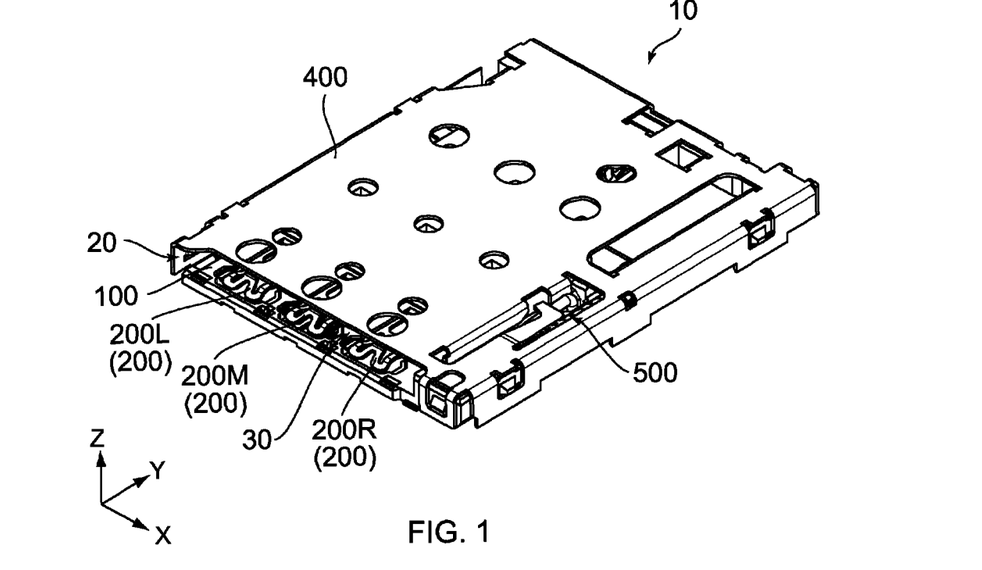
FIG. 1 is a perspective view showing a connector according to the embodiment of the present invention.
Figure 2:
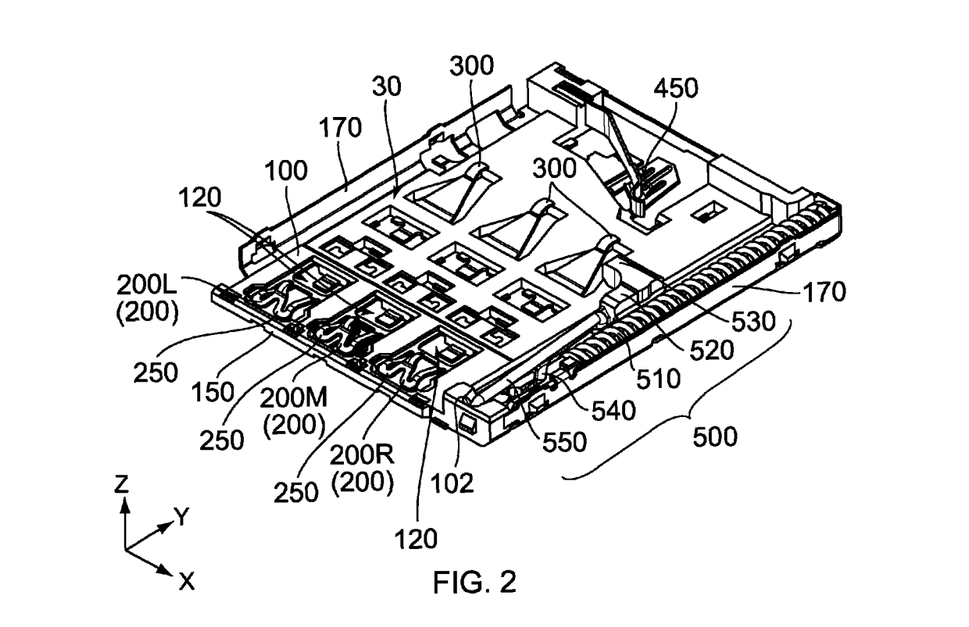
FIG. 2 is a perspective view showing a configuration other than a shell of the connector of FIG. 1.
Figure 3:
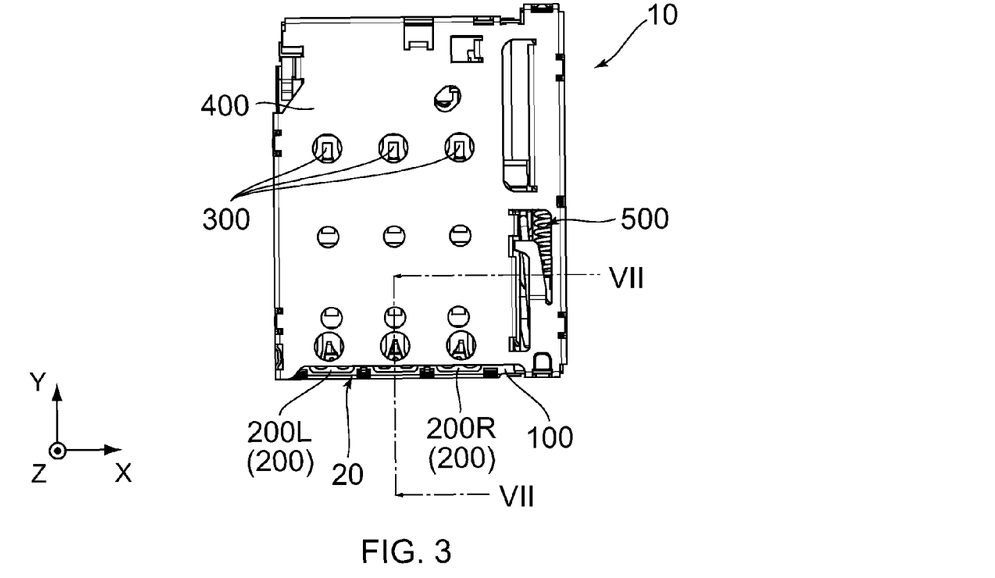
FIG. 3 is a top view showing the connector of FIG. 1.

Furthermore, as understood from FIGS. 2 and 4, a detection switch 450 and a push-push mechanism 500 are installed in the holding member 100. The detection switch 450 is positioned in the vicinity of a rear end, or a positive Y-side end, of the holding member 100. In other words, the detection switch 450 is positioned at a deep side of the accommodation portion 30. The detection switch 450 according to the present embodiment is a normally open type switch. Accordingly, when the card 800 is accommodated in the accommodation portion 30, the switch is turned on. However, the present invention is not limited thereto. The detection switch 450 may be a normally closed type switch.

As shown in FIGS. 2 and 4, the push-push mechanism 500 is positioned in the vicinity of a right end, or a positive X-side end, of the holding member 100. The push-push mechanism 500 according to the present embodiment comprises a spring 510, a slider 520 made of an insulating material and a cam follower 550 made of a metal. The slider 520 is supported by the holding member 100 so as to be slidable or movable along the front-rear direction (Y-direction). The slider 520 is pushed frontward (in the negative Y-direction) by the spring 510. An ejector 530 and a cam groove 540 are formed on the slider 520. The ejector 530 projects inward (i.e. toward a negative X-side or leftward) of the accommodation portion 30. The cam groove 540 includes a so-called heart cam. An end of the cam follower 550 is inserted into an axial hole 102 which is formed on the holding member 100 so that the other end of the cam follower 550 is movable on a circular arc track. The other end of the cam follower 550 is received into the cam groove 540 to be relatively moved along the heart cam.

Figure 5:
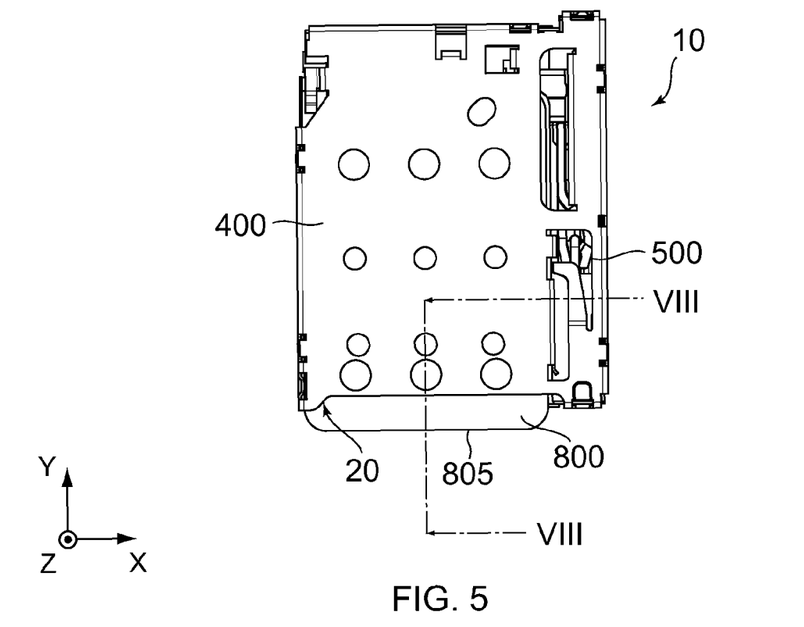
FIG. 5 is a top view showing a state where a card is accommodated in the connector of FIG. 3.
Figure 6:
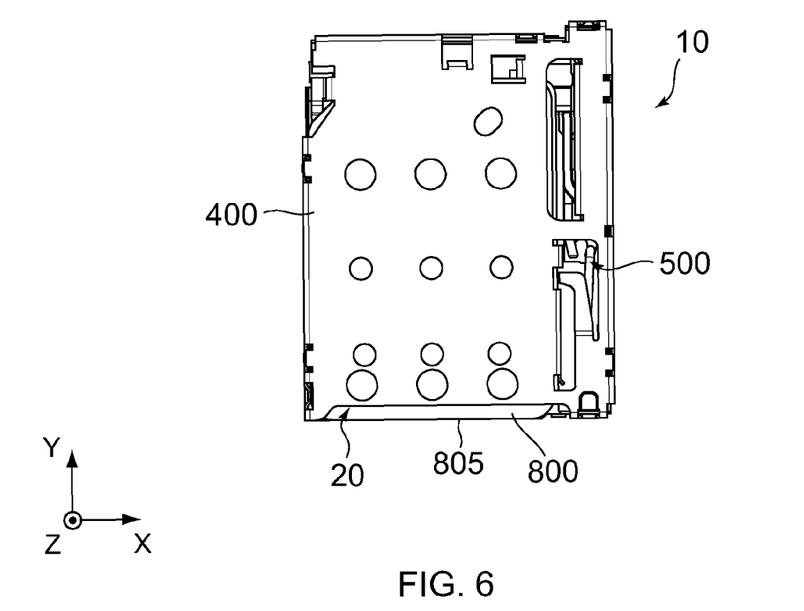
FIG. 6 is a top view showing a state where the card is pressed from the state of FIG. 5 in order to eject the card.

Accordingly, when a user releases his/her finger from the card 800 after the user temporarily pushes an end portion 805 of the card 800, which is accommodated in the accommodation portion 30, rearward, (i.e. after a state of the card 800 is transited from a state shown in FIG. 5 to a state shown in FIG. 6), the slider 520 is pushed in an ejecting direction (negative Y-direction) by the spring 510 so that the card 800 is moved toward the ejecting direction by the ejector 530. In addition, a structural detail of the push-push mechanism 500 is not limited to those illustrated in the present embodiment. The present invention includes a structure in which an operation similar to the present embodiment can be realized.

Figure 7:
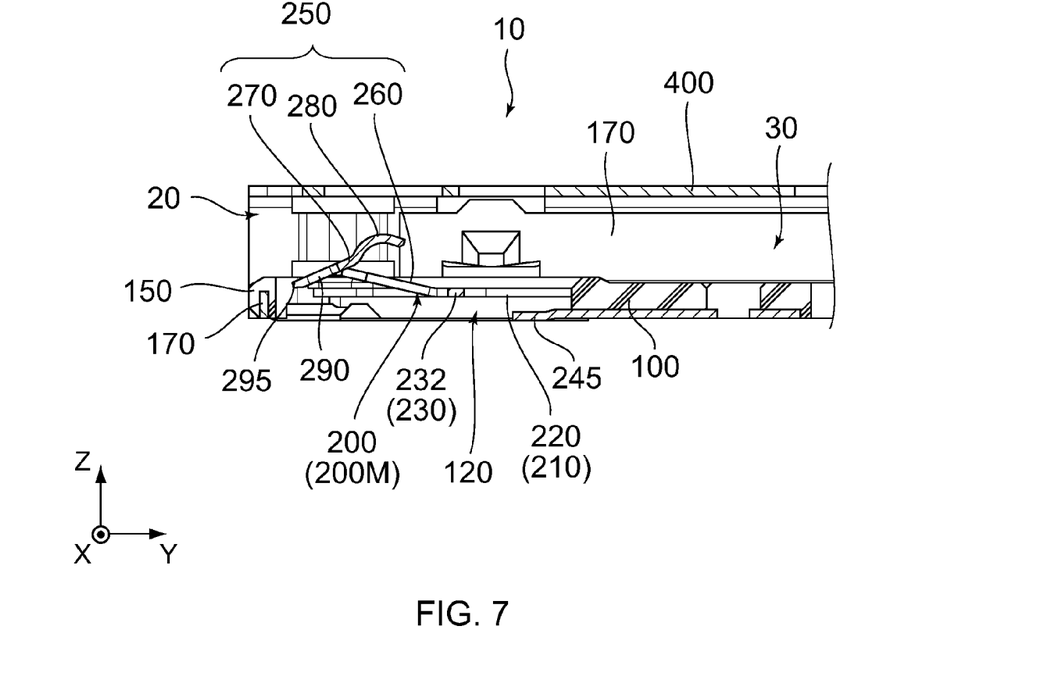
FIG. 7 is a cross-sectional view showing a part of the connector of FIG. 3, taken along line VII-VII.

As understood from FIGS. 2, 4 and 7, a guard portion 150 is constituted from a part of the holding member 100 and the reinforcing members 170 and is provided frontward of the contact 200. A function of the guard portion 150 will be described later.

As understood from FIGS. 1 to 4, the contacts 200 are positioned frontwards (toward the negative Y-side) of the contacts 300. The contacts 300 have the shapes same as each other. The contacts 200 are classified into a right side (positive X-side) contact 200R, a left side (negative X-side) contact 200L, and a middle contact 200M. Although, these contacts have partially different shapes as described later, they have configuration and function substantially same as each other. Hereafter, with reference to the middle contact 200M, a structure of the contact 200 is described.

As shown in FIGS. 7 to 14, the contact 200 has a base portion 210 and a spring portion 250.

Figure 11:
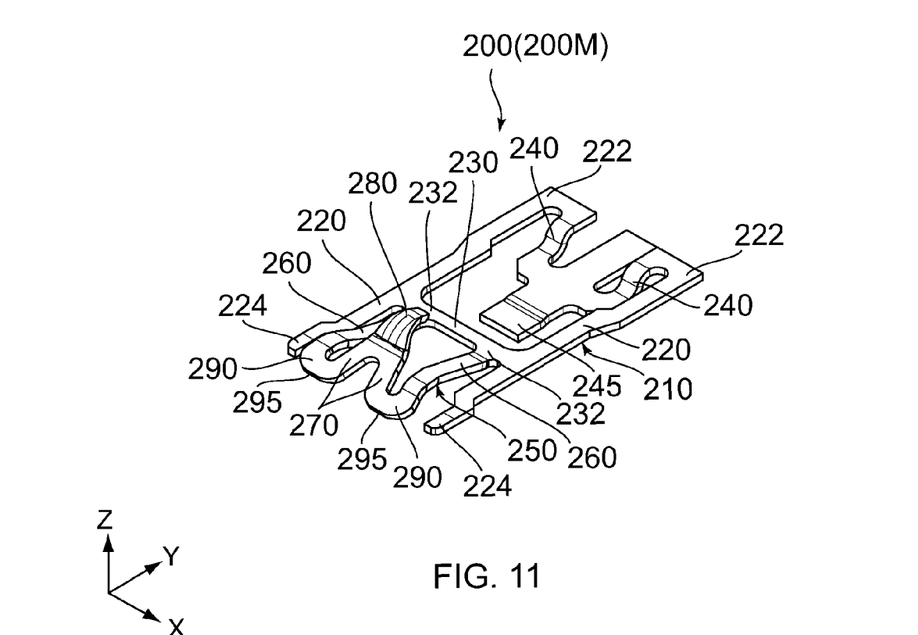
FIG. 11 is a perspective view showing the contact included in the connector of FIG. 1.
Figure 12:
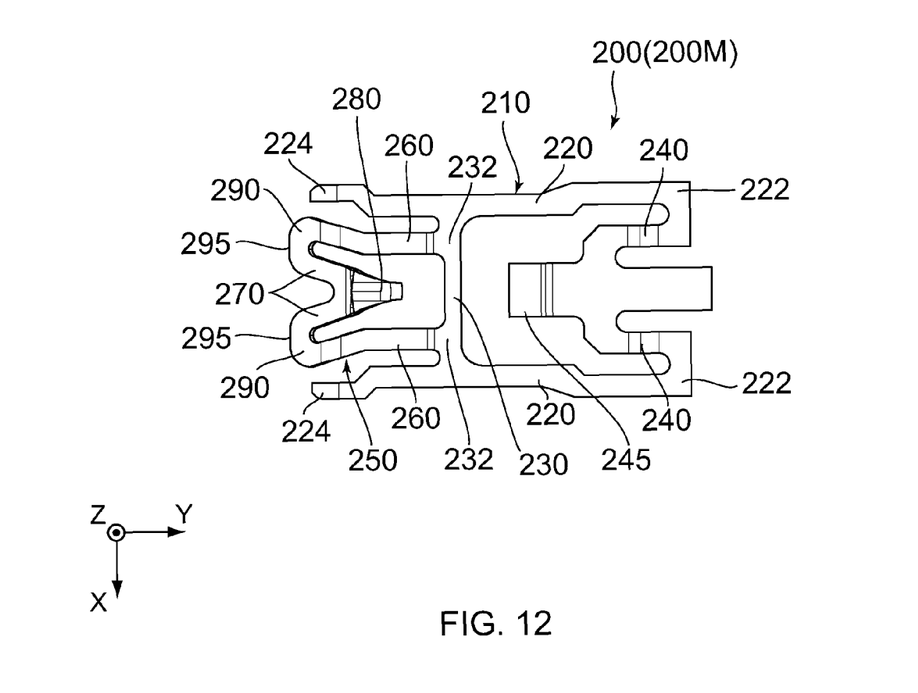
FIG. 12 is a top view showing the contact of FIG. 11.
Figure 13:
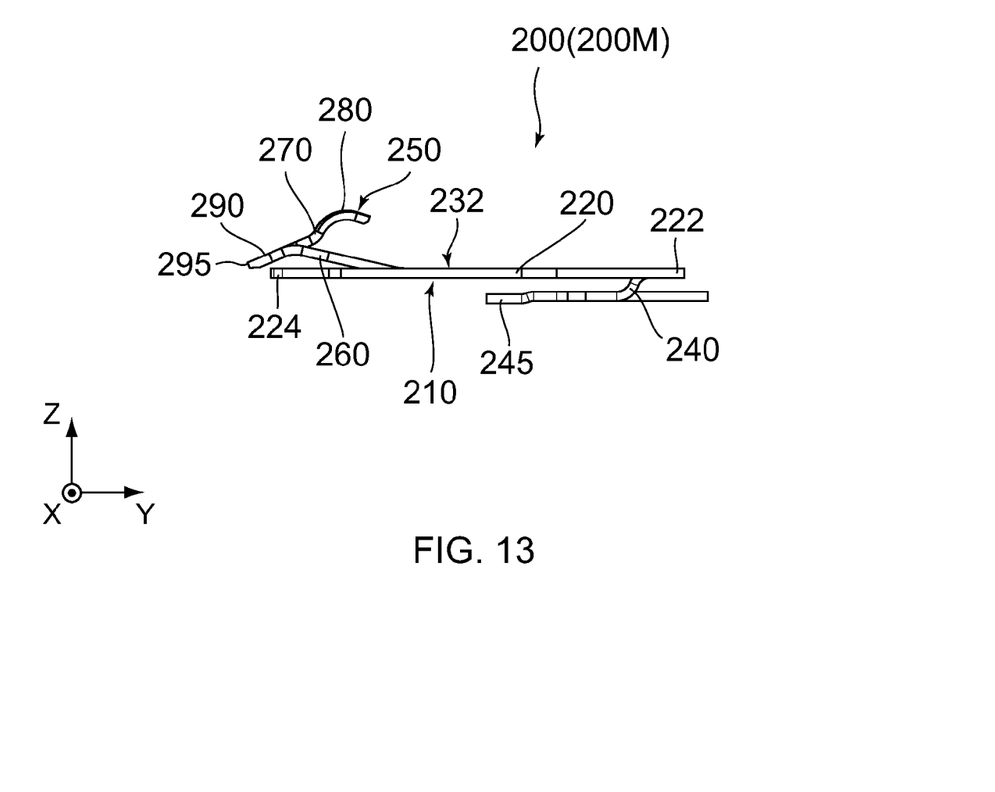
FIG. 13 is a side view showing the connector of FIG. 11.
Figure 14:
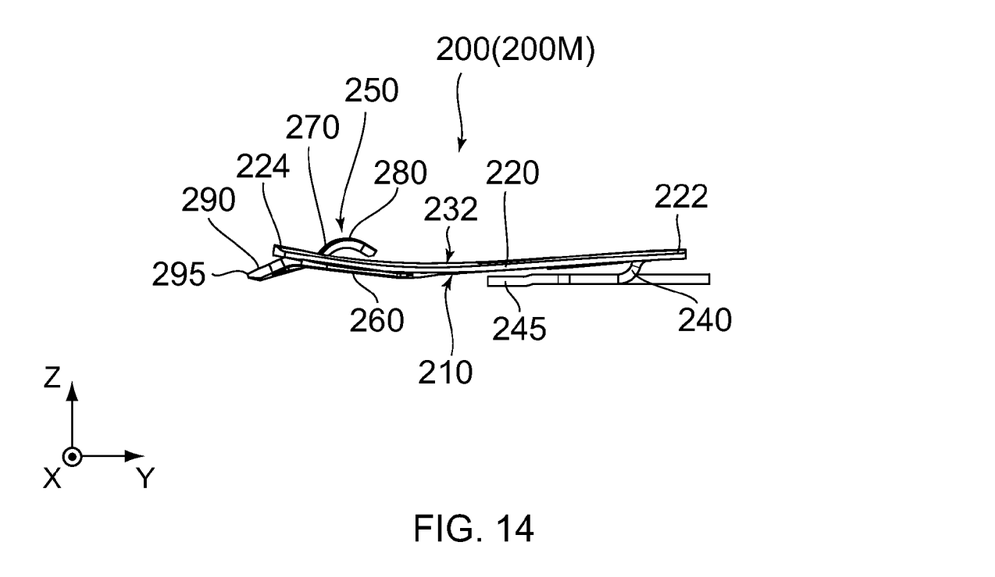
FIG. 14 is a side view showing the connector of FIG. 11, wherein the contact is deformed into the same shape as the shape of the contact in the connector which accommodates the card.

As shown in FIGS. 11 and 12, the base portion 210 according to the present embodiment has two main beam portions 220 and a coupling portion 230 which couples the main beam portions 220 in the width direction (X-direction). The coupling portion 230 is connected at an almost middle position of the main beam portion 220 in the front-rear direction (Y-direction). The main beam portion 220 and the coupling portion 230 form a structure having an H-shape. A rear end, or a positive Y-side end, of the main beam portion 220 is used as a rear supported portion 222. A front end, or a negative Y-side end, of the main beam portion 220 is used as a front supported portion 224. Specifically, as shown in FIG. 10, the rear supported portion 222 is mounted on the rear support portion 130 while the front supported portion 224 is mounted on the front support portion 140. In other words, the rear supported portion 222 is supported by the rear support portion 130 while the front supported portion 224 is supported by the front support portion 140. Accordingly, the rear supported portion 222 and the front supported portion 224 are movable at least in the front-rear direction and can slightly separate upward (toward a positive Z-side) from the rear support portion 130 and the front support portion 140. Therefore, the main beam portions 220 can be sufficiently bent.

As shown in FIGS. 9, 11 and 12, a part of the coupling portion 230 is used as a movable starting point 232. The movable starting point 232 is positioned between two of the front supported portions 224 in the width direction (X-direction). In addition, the movable starting point 232 is positioned between the rear supported portion 222 and the front supported portion 224 in the front-rear direction. Accordingly, the movable starting point 232 is movable in the up-down direction (Z-direction) by utilizing a deflection of the main beam portion 220. Especially, in the present embodiment, the main beam portion 220 can be sufficiently bent as described above so that the movable starting point 232 is sufficiently movable in the up-down direction.

As shown in FIGS. 11 and 12, the rear supported portions 222 of the base portion 210 are connected to held portions 240, respectively. Furthermore, the held portions 240 are connected to a fixed portion 245. The held portion 240 is positioned frontward (in the negative Y-direction) of the rear supported portion 222 while the fixed portion 245 is positioned frontward of the held portion 240. In detail, the illustrated held portion 240 first extends inward in the width direction (X-direction) from the rear supported portion 222 and, then, extends obliquely downward and frontward. The illustrated fixed portion 245 couples ends of the held portions 240 to extend so as to project further frontward (toward the negative Y-side). In other words, the fixed portion 245 extends toward the coupling portion 230 in the front-rear direction. As understood from FIGS. 9 to 12, the held portion 240 is a part which is held by the holding portion 110 of the holding member 100 while the fixed portion 245 is a part which is fixed by soldering on a substrate (not shown) where the connector 10 is mounted. As understood from a holding state of the held portion 240 by the holding portion 110, the holding member 100 holds the contact 200 by insert molding.

Figure 8:
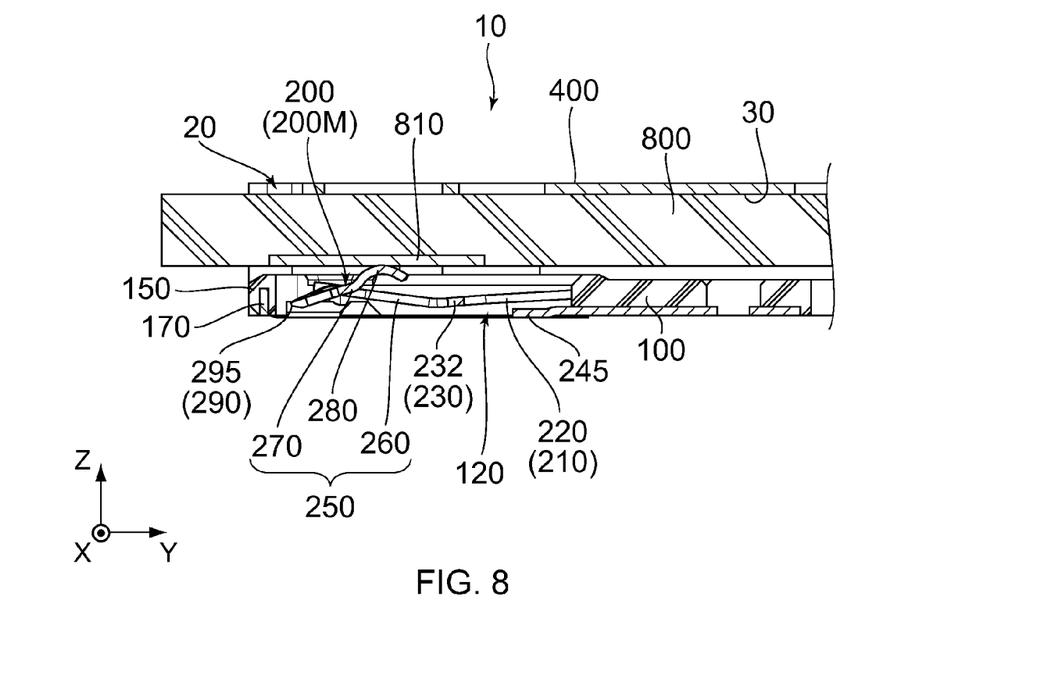
FIG. 8 is a cross-sectional view showing a part of the connector of FIG. 5, taken along line VIII-VIII.

As understood from FIGS. 7 to 9, 11 and 12, the spring portion 250 extends frontward (in the negative Y-direction) from the movable starting point 232. The movable starting point 232 is positioned between the front supported portions 224 in the width direction (X-direction). Thus, the spring portion 250 extends toward a space between the front supported portions 224. As shown in FIGS. 11 and 12, the spring portion 250 has two first beam portions 260 and two second beam portion 270. As shown in FIGS. 7, 8 and 11, the first beam portions 260 extend frontward from the movable starting points 232, respectively, while the second beam portions 270 extend rearward (in the positive Y-direction) from the first beam portions 260, respectively. As understood from FIG. 7, in detail, the first beam portion 260 extends frontward from the corresponding movable starting point 232 so as to be raised upward (in a positive Z-direction). Specifically, the first beam portion 260 extends obliquely upward and frontward from the corresponding movable starting point 232 and, then, extends obliquely downward and frontward. The second beam portion 270 extends obliquely upward and rearward from a front end (negative Y-side end) of the corresponding first beam portion 260 (see FIG. 7) and also extends inward in the width direction from the front end (negative Y-side end) of the corresponding first beam portion 260 (see FIGS. 11 and 12). As shown in FIGS. 11 and 12, two of the second beam portions 270 are connected to each other at their rear ends (positive Y-side ends), so that the connecting point becomes a contact point 280. In other words, the contact point 280 is provided at the second beam portions 270. As shown in FIG. 8, the contact point 280 is a part which contacts a terminal 810 of the card 800, and the contact point 280 is raised upward (in the positive Z-direction).

As understood from FIGS. 7, 11 and 12, when the card 800 is inserted into the accommodation portion 30 from the insertion opening 20 (in addition, see FIG. 8), the vicinities of front ends of the first beam portion 260 and the second beam portion 270 are pushed downward (in a negative Z-direction) by the card 800. Thus, the vicinities function as a guide portion 290 by which the contact point 280 is moved downward. In order to realize this function, as shown in FIG. 7, the guide portion 290 extends obliquely rearward and upward in an initial state where the card 800 is not inserted. Specifically, the guide portion 290 extends in a direction oblique to both the front-rear direction and the up-down direction in the initial state. In addition, a front end 295 (i.e. a front end 295 of the spring portion 250) of the guide portion 290 is positioned in the receiving portion 120 in the initial state. In other words, the front end 295 of the spring portion 250 is positioned below an upper surface of the holding member 100. The above-mentioned guard portion 150 of the holding member 100 is positioned frontward of the front end 295 of the spring portion 250 which is in the initial state. A part of the guard portion 150 and the front end 295 of the spring portion 250 are at the same position in the up-down direction (Z-direction). In other words, the guard portion 150 is provided so as to include an initial position of the front end 295 of the spring portion 250 in the up-down direction. As understood from FIGS. 7 and 8, the guard portion 150 prevents the card 800 from contacting the front end 295 of the spring portion 250 when the card 800 is inserted into the accommodation portion 30 from the insertion opening 20. Thus, the contact 200 is prevented from being buckled.

As understood from FIGS. 7, 8, 13 and 14, the spring portion 250 extends from the movable starting point 232 which is movable in the up-down direction (Z-direction) while the contact point 280 is provided on the spring portion 250. Thus, a moving distance of the movable starting point 232 in the up-down direction also contributes a moving distance of the contact point 280 in the up-down direction. Accordingly, a height of the contact point 280 after elastic deformation caused by the accommodation of the card 800 can be lowered. Specifically, a height from an upper surface of the substrate (not shown) mounting the connector 10 to the contact point 280 of the elastically deformed contact 200 can be reduced. Thus, the contact 200 can be elastically deformed by using the receiving portion 120 of the holding member 100, so that processing such as making a hole on the substrate (not shown) is not necessary.

The spring portion 250 is a part which extends from the movable starting point 232. Although a length of the spring portion 250 is shorter than a whole length of the contact 200, the moving distance of the movable starting point 232 in the up-down direction contributes the moving distance of the contact point 280 in the up-down direction. Accordingly, the contact point 280 can contact the terminal 810 of the card 800 at the same contact pressure as pressure in a case where the contact point 280 is supported by a sufficiently soft spring.

Especially, the spring portion 250 of the contact 200 according to the present embodiment has the first beam portion 260 and the second beam portion 270. Accordingly, a distance between the held portion 240 and the contact point 280 can be shortened while a length of a part having a spring property among the contact 200 is lengthened. In a case where a distance between the held portion 240 and the contact point 280 is short, the contact 200 is hardly deformed if force is applied to the contact 200 in the width direction (X-direction). In other words, according to the present embodiment, the contact 200 which secures a required spring property and is strong against force in the width direction can be obtained.

Figure 15:
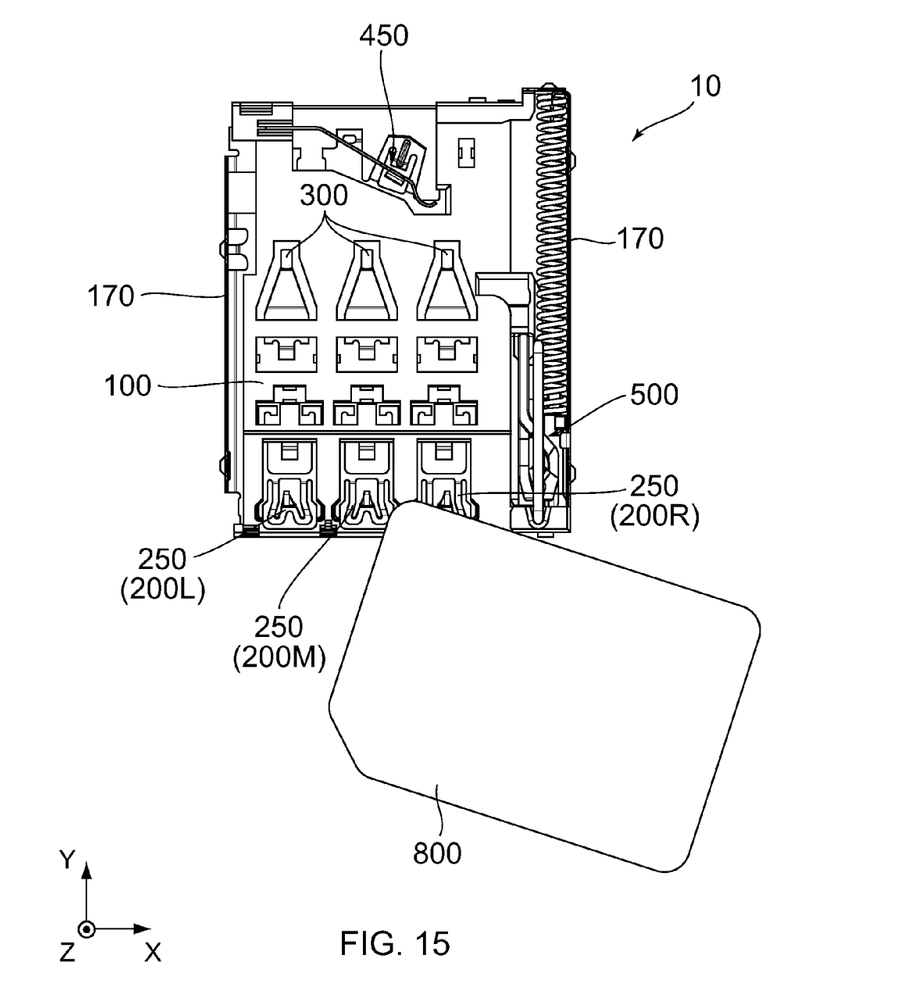
FIG. 15 is a top view showing a state where the card is inserted obliquely into the connector of FIG. 4.

Furthermore, as shown in FIG. 4, in the present embodiment, the right side contact 200R, the middle contact 200M, and the left side contact 200L have shapes different from each other. Although the spring portion 250 of the middle contact 200M has a symmetrical shape with respect to its center in the width direction, the spring portions 250 of the right side contact 200R and the left side contact 200L have asymmetrical shapes with respect to their centers in the width direction. In other words, in the present embodiment, the spring portions 250 of the right side contact 200R and the left side contact 200L which are positioned at both ends in the width direction (X-direction) among the contacts 200R, 200M and 200L arranged in the width direction (X-direction) have asymmetric shapes with respect to their centers in the width direction. More particularly, the contact point 280 of the right side contact 200R is positioned on the right side (positive X-side) of the center of its spring portion 250 in the width direction while the contact point 280 of the left side contact 200L is positioned on the left side (negative X-side) of the center of its spring portion 250 in the width direction. As understood from FIGS. 3, 4 and 15, when the card 800 is inserted into the insertion opening 20, the card 800 never hits the right side contact 200R from the right side thereof while the card 800 never hits the left side contact 200L from the left side thereof because the connector 10 comprises the shell 400 and the reinforcing members 170. On the other hand, with regard to the right side contact 200R, sometimes the card 800 hits the left side of the right side contact 200R to apply rightward large force thereto in comparison to the middle contact 200M. Similarly, with regard to the left side contact 200L, sometimes the card 800 hits the right side of the left side contact 200L to apply a leftward large force thereto in comparison to the middle contact 200M. At that time, in a case where the spring portions 250 of the left side contact 200L and the right side contact 200R have asymmetrical shapes similar to the shape of the spring portion 250 according to the present embodiment, when rightward force or leftward force is applied to the spring portion 250, the left side contact 200L and the right side contact 200R can be prevented from being broken.

While the connector 10 according to the embodiment of the present invention has been described above, the present invention is not limited to the illustrated embodiment.

While the aforementioned card 800 according to the present embodiment is a nano SIM card, the present invention is not limited thereto. The connector of the present invention is also applicable to a connector for a micro SIM (third form factor (3FF)) card or a full-sized SIM card.

While the aforementioned connector 10 according to the present embodiment has the push-push mechanism 500, the present invention is applicable to a connector which does not have the push-push mechanism 500. Nonetheless, the connector 10 with the push-push mechanism 500 has more advantages of the present invention than a connector which does not have the push-push mechanism 500. Specifically, as understood from FIGS. 5, 6 and 8, if the connector 10 has the push-push mechanism 500, a connection between the card 800 and the connector 10 is maintained while the card 800 partially projects out from the insertion opening 20. Therefore, as compared with a connector which does not have the push-push mechanism, the terminal 810 of the card 800 is closer to the insertion opening 20 of the connector 10 which has the push-push mechanism 500 by a protrusion amount of the card 800. Even in this case, as described above, sufficient constant pressure can be secured as a contact pressure of the contact point 280 against the terminal 810.

While two of the rear supported portions 222 and two of the front supported portions 224 are provided in the aforementioned embodiment, the present invention is not limited thereto. One of the front supported portion 224 or one of the rear supported portion 222 may be provided. Either of the front supported portion 224 and the rear supported portion 222 may be held by the holding member 100 so as not to be moved in the front-rear direction.

Figure 16:
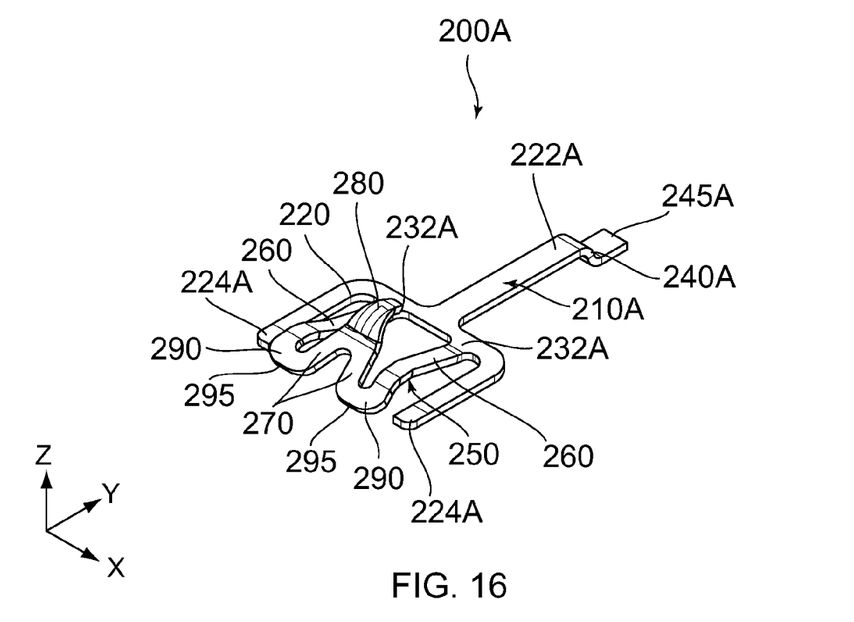
FIG. 16 is a perspective view showing a modification of the contact.
Figure 17:
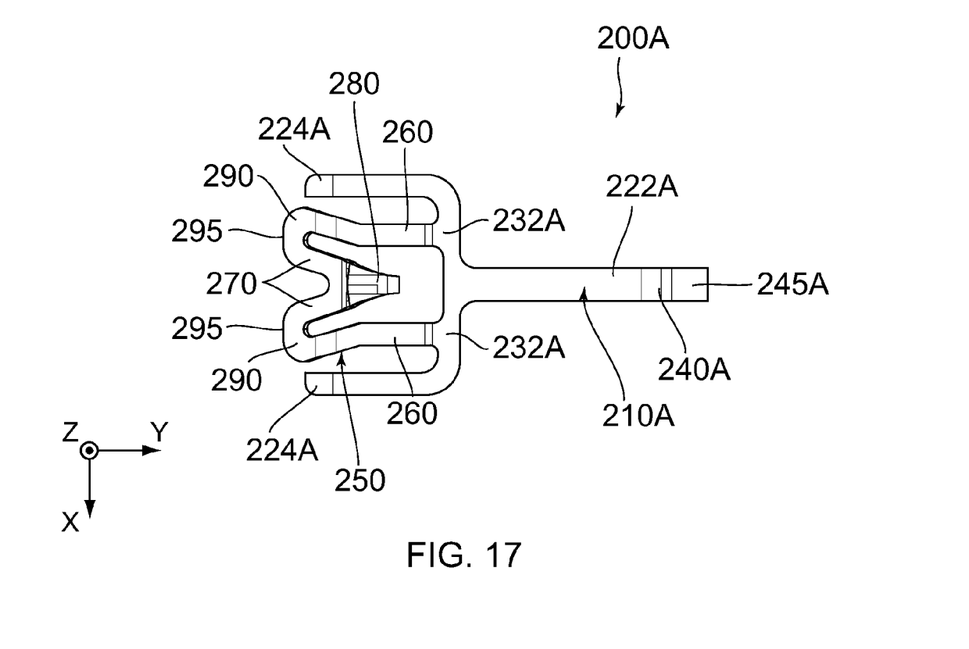
FIG. 17 is a top view showing the contact of FIG. 16.

As shown in FIGS. 16 and 17, a contact 200A according to a modification has a base portion 210A of an angular Y-like shape and the spring portion 250. The spring portion 250 has a shape same as the aforementioned contact 200 according to the present embodiment. Accordingly, the portions which are same as those of the contact 200 are referred by using reference signs same as those of the contact 200, and detailed explanation about the same portions are not made.

The base portion 210A has a rear supported portion 222A and two front supported portions 224A. The base portion 210A is provided with two movable starting points 232A. The movable starting points 232A are positioned between the rear supported portion 222A and the front supported portions 224A in the front-rear direction. In addition, each of the movable starting points 232A is positioned between two of the front supported portions 224A in the width direction. In detail, each of the movable starting point 232A is positioned between the rear supported portion 222A and the corresponding front supported portion 224A. A held portion 240A extends rearward from the rear supported portion 222A while a fixed portion 245A is positioned rearward of the held portion 240A.

Figure 18:
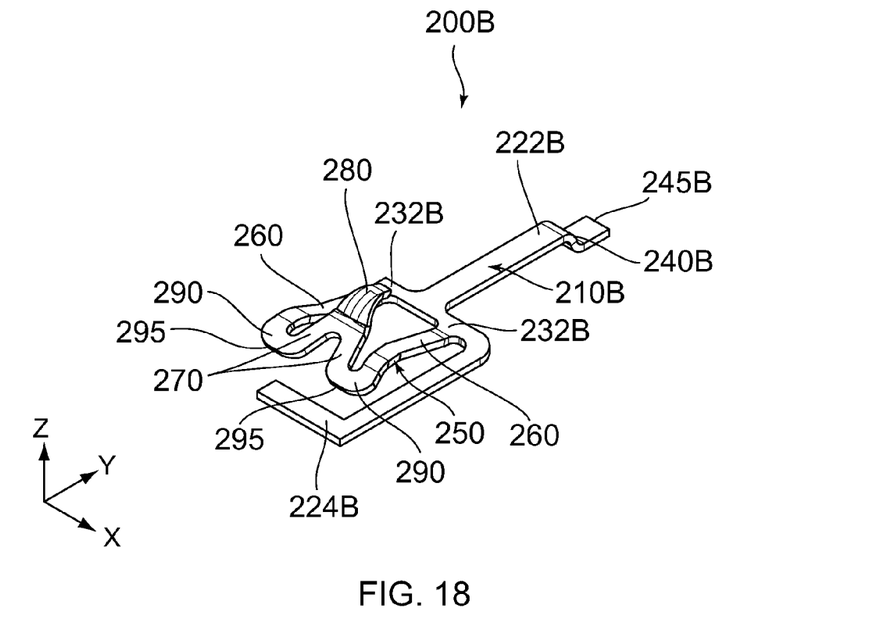
FIG. 18 is a perspective view showing another modification of the contact.
Figure 19:
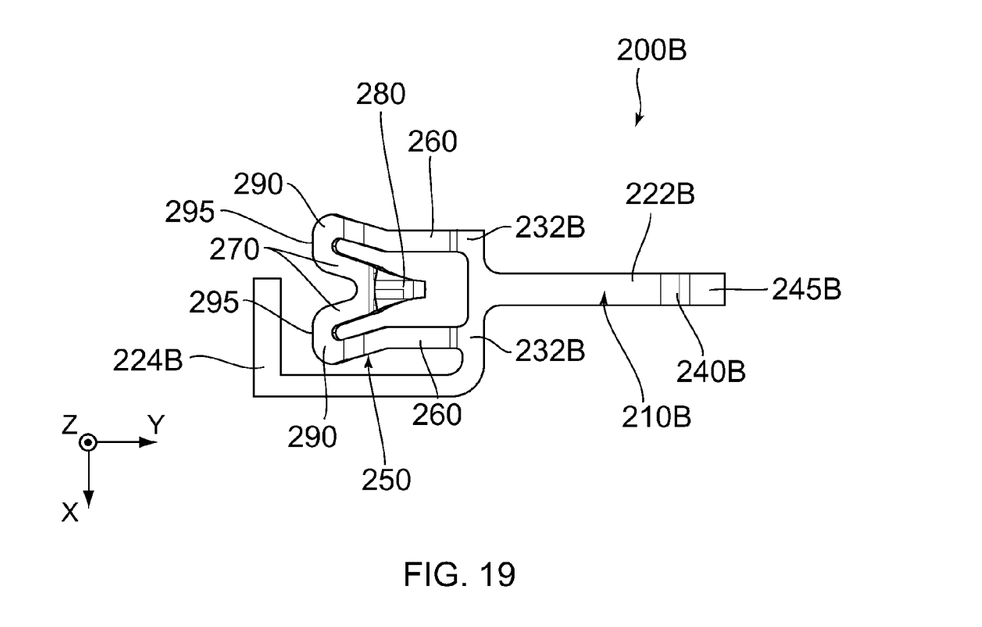
FIG. 19 is a top view showing the contact of FIG. 18.

As shown in FIGS. 18 and 19, the contact 200B according to another modification has a base portion 210B of a dipper-like shape and the spring portion 250. The spring portion 250 has a shape same as the aforementioned contact 200 according to the present embodiment. Accordingly, the portions which are same as those of the contact 200 are referred by using reference signs same as those of the contact 200, and detailed explanation about the same portions are not made.

The base portion 210B has a rear supported portion 222B and a front supported portion 224B. The base portion 210B is provided with two movable starting points 232B. The movable starting points 232B are positioned between the rear supported portion 222B and the front supported portion 224B in the front-rear direction. Although the base portion 210B has the front supported portion 224B, the front supported portion 224B extends in the width direction so that the front supported portion 224B can be supported by a plurality of the front support portions. A held portion 240B extends rearward from the rear supported portion 222B while a fixed portion 245B is positioned rearward of the held portion 240B.

The present application is based on a Japanese patent application of JP2013-206663 filed before the Japan Patent Office on Oct. 1, 2013, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector which is connectable with a card which is insertable from an insertion opening of the connector, the card having a terminal, the connector comprising:
a holding member having a rear support portion and a front support portion, the front support portion being closer to the insertion opening than the rear support portion in a front-rear direction; and a contact being held by the holding member, the contact having a base portion and a spring portion, the base portion having a rear supported portion, a front supported portion and a movable starting point, the rear supported portion being supported by the rear support portion, the front supported portion being supported by the front support portion, the movable starting point being positioned between the rear supported portion and the front supported portion in the front-rear direction and being movable in an up-down direction perpendicular to the front-rear direction, the spring portion extending frontward from the movable starting point in the front-rear direction, the spring portion being provided with a contact point which is to be in contact with the terminal of the card,
wherein:
the base portion has two of the front supported portions;
the front supported portions are supported by the front support portion so as to be movable at least in the front-rear direction; and
the movable starting point is positioned between the front supported portions in a width direction perpendicular to both the front-rear direction and the up-down direction.

2. The connector as recited in claim 1, wherein:
the base portion comprises two main beam portions and a coupling portion, the coupling portion coupling the main beam portions in the width direction;
each of the main beam portions has the front supported portion and the rear supported portion; and
the movable starting point is provided on the coupling portion.

3. The connector as recited in claim 1, wherein:
the spring portion has a first beam portion and a second beam portion;
the first beam portion extends frontward from the movable starting point;
the second beam portion extends rearward from the first beam portion; and
the contact point is provided on the second beam portion.

4. The connector as recited in claim 3, wherein:
the spring portion has two of the first beam portions and two of the second beam portions; and
the second beam portions are connected at the contact point.

5. The connector as recited in claim 1, wherein the rear supported portion is supported by the rear support portion so as to be movable at least in the front-rear direction.

6. The connector as recited in claim 1, wherein:
the connector is mounted on a board;
the contact further has a held portion and a fixed portion;
the held portion is held by the holding member;
the fixed portion is fixed on the board;
the held portion is positioned frontward of the rear supported portion in the front-rear direction; and
the fixed portion is positioned frontward of the held portion in the front-rear direction.

7. The connector as recited in claim 1, wherein:
the connector comprises a plurality of the contacts arranged in the width direction;
the plurality of the contacts include at least one end contact which is positioned at an end thereof in the width direction; and
the spring portion of the end contact has an asymmetrical shape with respect to a center of the spring portion in the width direction.

8. The connector as recited in claim 1, wherein the connector has a push-push mechanism which temporarily pushes the card rearward in order to eject the card which is accommodated in the connector.

9. The connector as recited in claim 1, wherein:
the connector further comprises a guard portion which guards a front end of the spring portion; and
when the card is not inserted into the connector, the guard portion is provided so as to be positioned frontward of the front end of the spring portion in the front-rear direction and is provided so as to include a position of the front end of the spring portion in the up-down direction.

* * * * *